Patented May 23, 1933

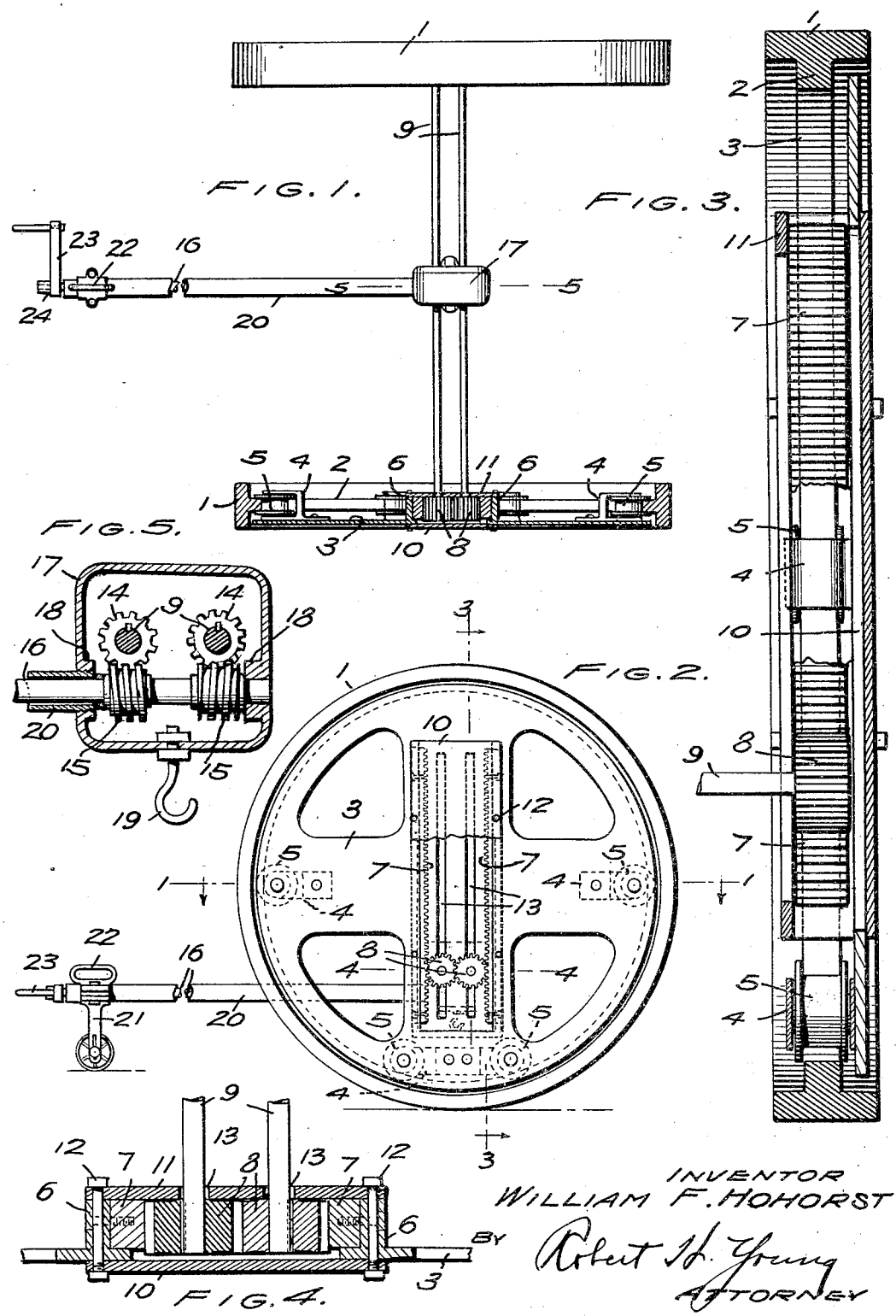

1,910,436

UNITED STATES PATENT OFFICE

WILLIAM F. HOHORST, OF SCOTT FIELD, BELLEVILLE, ILLINOIS

AIRPLANE DOLLY

Application filed October 21, 1931. Serial No. 570,142.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention has reference to an airplane dolly for use in jacking up airplanes or shifting same about while on the ground, and the object of the invention is to provide an improved dolly construction especially designed to lift the tails of the larger and heavier type of airplanes.

A further object of the invention is to provide an airplane dolly of a construction which is light in weight and compact in design, easy to assemble or take apart, and readily movable from place to place.

Further objects and advantages of the invention will be apparent from the following detailed description of the device and from the accompanying drawing, wherein:

Figure 1 is a top plan view of the invention;

Figure 2 is a side elevation thereof;

Figure 3 is a sectional view on line 3—3 of Fig. 2;

Figure 4 is a sectional view on line 4—4 of Fig. 2, and

Figure 5 is a sectional view on line 5—5 of Fig. 1.

The dolly comprises a pair of substantially large wheel units respectively consisting of a steel rim 1 having a track 2 on the inside and a disc 3 which is stationary relatively to the rim. Secured to the disc at suitably spaced points are brackets 4 which carry double flanged rollers 5 engaging the track 2 and serving as bearings for the rim 1.

Each disc is slotted vertically of its central portion and each side of the slot, on the inner face of the disc, is bordered by a flange 6. To each flange is bolted or otherwise secured a spur rack 7 with which engages a spur gear 8. Two sets of spur gears 8 are provided, there being a gear keyed to each end of the two axles 9 or hoist elements which are adapted to travel up and down the racks 7. The spur gears are covered on the outside by a cover plate 10 and on the inside by a plate 11, both plates being fastened to the disc by bolts 12. Plate 11 is provided with slots 13 to accommodate the axles 9.

The axles 9 are rotated by a gear mechanism including worm wheels 14 keyed to the axles intermediate the ends of the latter and in mesh with worms 15 keyed to crank shaft 16. The worm wheels and gears are enclosed within a housing 17, as shown in Fig. 5, in which housing the end of crank shaft 16 is supported in suitable bearings 18. Fixed to the bottom of the housing and depending therefrom is a hook 19 which is adapted to be engaged with the tail wheel skid or other portion of the airplane to be lifted.

The crank shaft 16 extends through a tubular housing 20 connected at one end to the gear housing 17 and at its outer end supported by a wheeled truck 21 attached to the housing by a clamp so as to be adjustable lengthwise of the housing. The dolly is moved about by means of a hand grip 22 mounted on the clamp of the wheeled truck. The outer end of the crank shaft projects beyond the crank shaft housing and is threaded to receive a crank handle 23 by means of which the crank shaft is manually rotated. A lock nut 24 holds the crank handle in place.

In using the device, the dolly is moved into position relative to the airplane to be lifted and the hook 19 is engaged under the tail wheel skid. The crank handle 23 is then turned to rotate shaft 16 and axles 9 so that the gears 8 travel upwardly on the racks 7, the shaft, axles and housings being thereby lifted bodily and as a unit with a consequent lift or elevation of the tail unit of the airplane. Since the rims 1 rotate freely about the discs 3, the entire device can be drawn easily over the ground when moving the airplane from one location to another.

Having thus described the invention what is claimed is:

1. An airplane dolly comprising a pair of wheel rims, a track on the inner side of each rim, a non-rotatable disc within each rim, rollers carried by the discs and engaged with the tracks to provide bearings for the said rims, a rack on each disc, an axle member between the discs and geared with the racks for movement vertically between the wheel rims, a hook carried by said axle structure for connection with the tail of an airplane, and means for rotating the said axle member to effect vertical movement thereof relative to the said racks.

2. An airplane dolly comprising a pair of wheel rims, a non-rotatable disc within each rim, anti-friction-bearings between each disc and its rim, a bridge structure coupling the said discs and connected to each disc so as to be adjustably vertically thereof, means carried by said bridge structure for connection with the tail of an airplane, means for adjusting said bridge structure vertically of the said discs, and handle means associated with said adjusting means to facilitate the moving about of the device.

3. An airplane dolly comprising a pair of wheel rims, a track on the inner side of each rim, a relatively stationary disc within each rim, rollers carried by the discs and engaging the tracks to provide bearings for the rims, a rack on each disc, a pair of axles, pinions fixed on the said axles and engaging the racks for traveling along the same, worm wheels on said axles, a crank shaft, worms on said shaft and engaged with said worm wheels, a housing for said worms and wheels, a hook on the underside of said housing, a housing for said crank shaft, a support for the said crank shaft and crank shaft housing, and a crank handle on said crank shaft.

4. An airplane dolly having, in combination, supporting wheels respectively composed of an outer rotatable rim and an inner stationary disc about which the rim rotates, a hoist member, extending transversely between the wheels and slidably connected at each end to the said wheel discs for adjustment vertically thereof, and means for adjusting said hoist member.

5. An airplane dolly having, in combination, supporting wheels, respectively composed of an outer rotatable rim and an inner stationary disc about which the rim rotates, vertical guides on the discs, a hoist member extending transversely between the wheels and constrained to slide in the said guides, and means for raising and lowering the said hoist member.

6. A wheeled structure comprising a pair of wheels each of which consists of an outer rotatable rim and an inner stationary disc about which the rim revolves freely, a connecting axle between the wheels and geared to the said discs for adjustment vertically of the discs, and means for adjusting the axle.

In testimony whereof I affix my signature.

WILLIAM F. HOHORST.